Oct. 22, 1957  H. K. HACK  2,810,307
BALANCING APPARATUS
Filed July 26, 1951  7 Sheets-Sheet 4

Oct. 22, 1957 H. K. HACK 2,810,307
BALANCING APPARATUS
Filed July 26, 1951 7 Sheets-Sheet 5

United States Patent Office

2,810,307
Patented Oct. 22, 1957

2,810,307

BALANCING APPARATUS

Heinrich Karl Hack, Gross Zimmern, near Darmstadt, Germany, assignor to Carl Schenck Maschinenfabrik G. m. b. H., a corporation of Germany Application July 26, 1951, Serial No. 238,649

Claims priority, application Germany August 4, 1950

8 Claims. (Cl. 77—5)

My invention relates to methods and apparatus for balancing revolvable bodies.

Revolvable bodies, hereinafter briefly called rotors, are usually balanced by revolving them on a balancing machine and determining the position and magnitude of unbalance. Usually, the unbalance values thus analyzed are marked on the work piece or on an accompanying work sheet. In most cases, the unbalance correction, for instance by drilling, is effected outside of the balancing machines. When corrected, the work pieces are returned to the balancing machine for checking. The time for completing a balancing job remains considerable even with a most skillful interplay of all operations. This is especially noticeable in the series manufacture of large quantities.

It has been attempted to shorten the working time by mounting a drill press or a welding machine directly on the balancing machine and to process the rotor directly on the bearings of the balancing machine. Then however, the balance analyzing equipment remains idle for the entire duration of the machining operations. There have also been machining plants in which the unbalance magnitudes determined on a balancing machine are transferred to a nearby drill press. The rotor, after being analyzed, passes over a roller conveyor to the drill press for machining, and the operator of the balancing machine need no longer concern himself with the operation of the drill press and may perform another unbalance analysis during the drilling period.

It is an object of my invention to improve the balancing of rotors toward a further and considerable reduction in the time required for a complete balancing job including the unbalance analyzing as well as the unbalance correcting operations, and toward a more economical utilization of the analyzing and correcting machinery. Another, ancillary object of my invention is to attain a flowing interplay of the various operational steps involved in a complete unbalance detecting operation and a control of the unbalance correcting performance so as to permit a continuous balance processing of any number of series-manufactured work pieces.

Another object of my invention is to reduce the space needed for the entire set of machinery involved in the unbalance detecting and correcting operations, and to reduce the necessary manipulation to a minimum well within the capacity of a single operator thus reducing the amount of labor required for a continuous flow of balancing operations.

An object, related to the one just mentioned, is to provide an automatic mechanism for transferring a work piece between the balance analyzing position and the balance correcting or machining position of the balancing machinery, or generally between two positions of processing or machining equipment where different operations are to be performed.

Still another object of my invention is to devise an electric control device for controlling the work-piece machining portion, such as the machine tool needed for unbalance correction, by previously registered values obtained as a result of an unbalance analysis on the analyzing portion of the machine.

According to one of the features of my invention, a rotor to be balanced is first balance analyzed while revolving in one position of a machine so that its unbalance is separated into individual components, preferably into two directionally correlated components in each desired correction plane. The magnitudes of the unbalance components thus determined are stored. Then the rotor is transferred to a second processing position and subjected to unbalance-correcting machining, for instance to several drilling operations that remove material at places and in quantities corresponding to the previously analyzed unbalance components, and this machining is controlled in dependence upon the stored data to establish the desired balance of the rotor.

According to a feature of the invention, a two-position processing machinery suitable for the just-mentioned operations, is designed as a single machine unit which combines on a common base structure a balancing machine section and a machine tool section with one or more machine tools and has an exchange mechanism for transferring a work piece from the supporting journals of one section to those of the other.

The foregoing and other objects and features of the invention will be apparent from, or will be referred to in, the following in conjunction with the embodiment of the invention exemplified on the drawings, the essential features of the invention being more fully and with particularity set forth in the claims annexed hereto.

All figures of the drawings relate to a single embodiment of a balance analyzing and correcting machine for simultaneously processing two work pieces.

Fig. 1 is a diagram of the entire machine including a schematic showing of its mechanical components and a single-line circuit diagram of the pertaining electric components.

Figs. 2 and 3, together, show the circuit diagram more in detail, one being a continuation of the other. The electric conductors marked $a$ to $d$ and $c'$ to $d'$ at the bottom of Fig. 2 are understood to be identical or joined with the respective equally marked conductors at the top of Fig. 3.

Figs. 4 and 5 and 8–10 exemplify details of respective contact devices pertaining to the circuits shown in the preceding figures. Fig. 6 shows schematically a tool-feed responsive device also pertaining to the circuits of Figs. 1 to 3.

Figure 11:
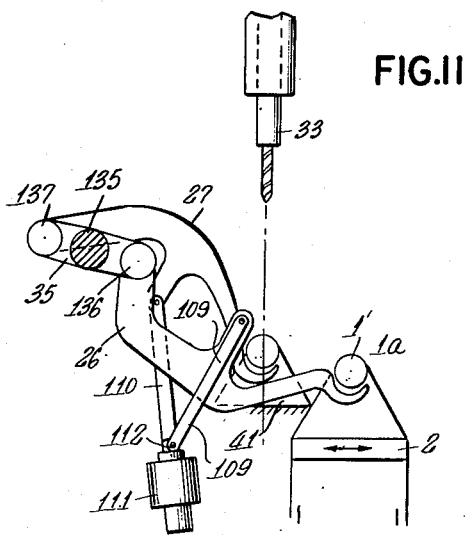
Figure 14:
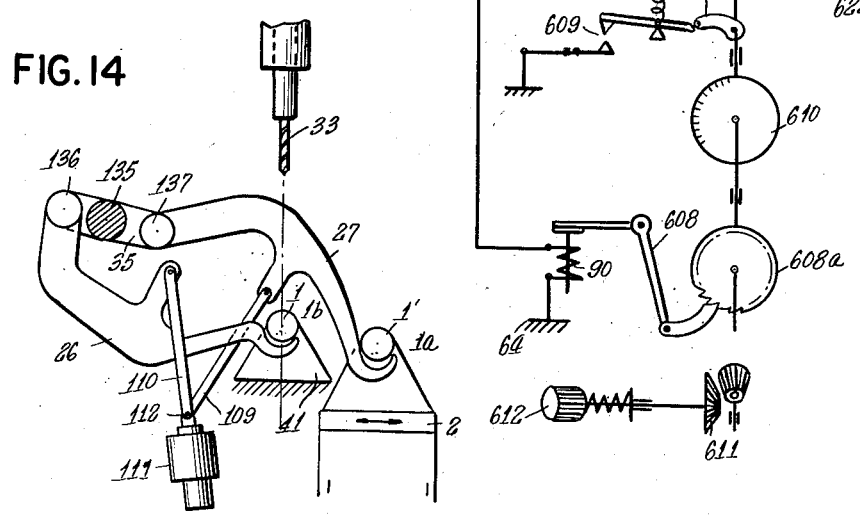
Figure 12:
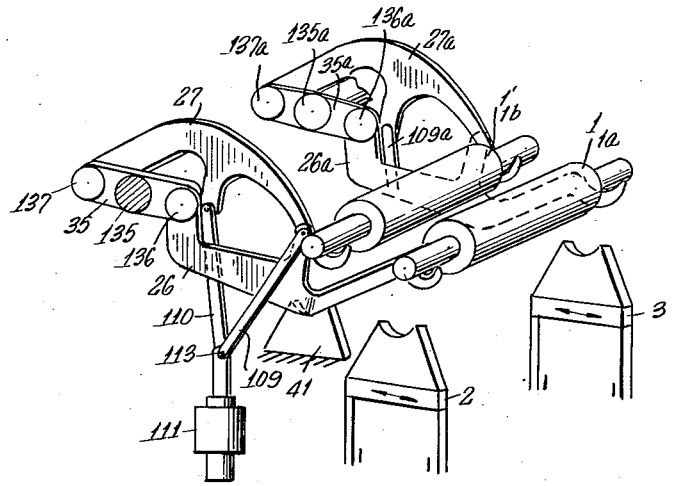
Figure 13:
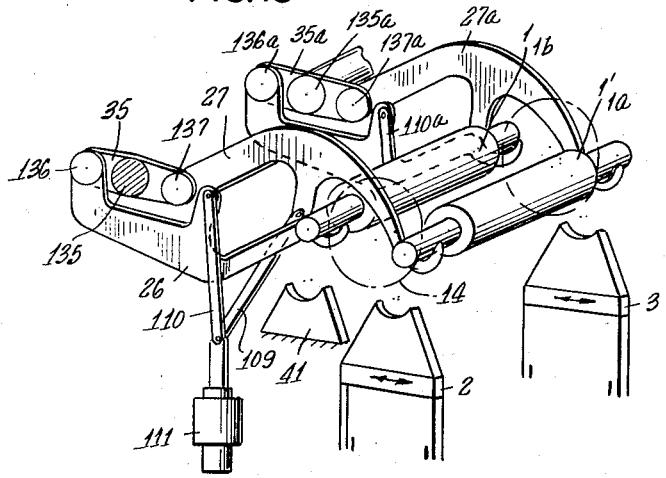

Figs. 11 to 14 illustrate details of the work-piece exchange mechanism of the machine in respectively different stages of operation. Figs. 11 and 14 are front views. Figs. 12 and 13 show the mechanism in perspective.

Referring to the drawings, a general description of the illustrated apparatus will first be given with reference to Fig. 1, before presenting a detailed description in conjunction with the other illustrations.

Figure 1:
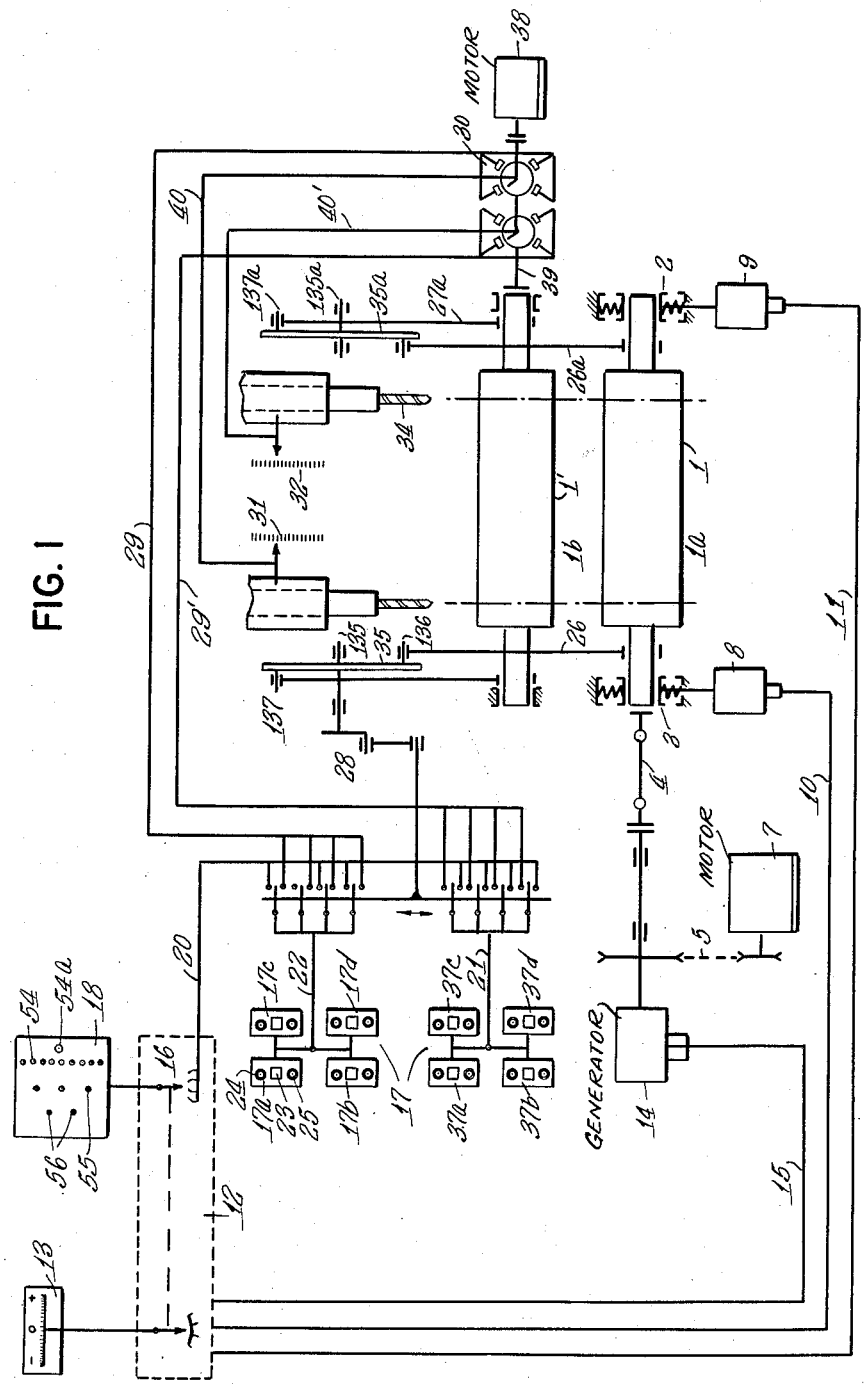

According to Fig. 1, the work piece or rotor 1 to be balanced is journalled in oscillatorily mounted bearings 2, 3 of a balancing machine (position 1a) and is driven through a Cardan-joint coupling 4 and a V-belt drive 5 from a motor 7. The oscillations due to unbalance of the rotor are transmitted to pickups 8, 9, for instance of the moving-coil type, which translate the mechanical oscillations into electric currents in the well-known manner. The currents are supplied through leads 10, 11 and through a four-position selector switch 12 to a wattmetric instrument 13 which has a center-zero scale for indicating positive and negative departures from the zero value. A phase-adjustable wave generator 14, revolving in synchronism with the rotor, passes selectively one of two 90° phase-displaced currents through a lead 15 to the wattmeter 13. The indication of the wattmeter, as in the known wattmetric unbalance measuring systems, is representative of the unbalance components to be determined. The four-position switch 12, also as known for balancing machines, has the purpose of permitting an individual reading of each of four component values of a dynamic unbalance. For instance, when the dynamic unbalance of a revolving body is analyzed into two mutually perpendicular components in each of two radial and axially separate reference planes (correction planes) of the body, such as a right-hand correction plane and a left-hand correction plane, then the wattmeter, in each of the four positions of switch 12, will individually indicate the left-vertical, left-horizontal, right-vertical, right-horizontal components ($Ls$, $Lw$, $Rs$, $Rw$).

Figure 2:
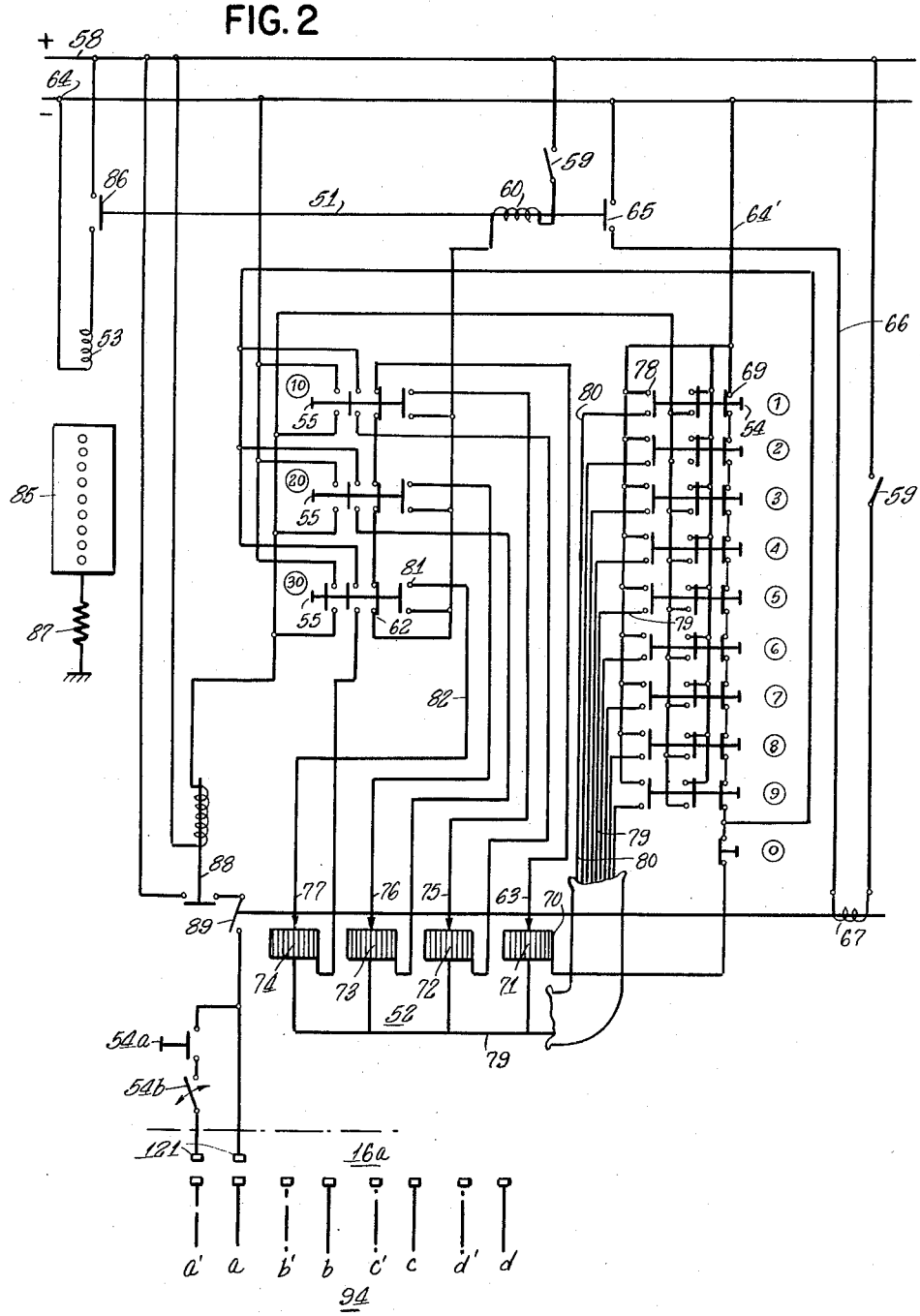

The values read off the indicating scale of the wattmeter 13 are individually translated into electric pulses, corresponding to the plus and minus direction of the indicated deflection and to the unit and tens digits of the value. This translation into a series of pulses is effected by means of a registering device 18 of the push button type. The registering device has two push buttons 56 (Figs. 1, 3) for plus and minus respectively, ten push buttons 54 for the unit digits of the value and several push buttons 55 of the tens digits, three such push buttons 55 being illustrated (Figs. 1 and 2). The push buttons are designated by indicia (1) to (0), (10), (20) and (30) corresponding to the correlated numerical values, respectively. Each push button, when depressed, causes the issuance of a corresponding number of electric pulses in accordance with the number and direction (plus or minus) indicated on the scale of the wattmeter. The pulses are supplied to a storage device 17 with individual storer units 17a, 17b, 17c, 17d and 37a, 37b, 37c, 37d. The four-position switch 12 has an additional selector portion 16 correlated to the known four unbalance components $Lw$, $Ls$, $Rw$, $Rs$. The switch portion 16 serves to select one of the storer units of device 17 which is switched-in through a switch 19. Assume that in the illustrated embodiment the pulses are supplied from push button device 18 through the selector switch portion 16, lead 20 and storer switch 19 to the storer unit 17a. Then the storer 17a (and in the same manner each other individual storer unit) shows the value of the adjusted digit on an indicating scale 23. The storer is further equipped with lamps 24 and 25, one of which is lighted at a time to then indicate the direction of the unbalance corresponding to the plus or minus value of the wattmeter reading. In this manner the storer 17a, or each other storer that may be in operation at a time, permits checking whether the proper digit push buttons have been depressed to adjust the storing device to the reading of the wattmeter. Any faulty adjustment can thus be recognized and may be corrected by actuation of a reset contact 54a. The reset contact 54a is series connected with a self-interrupter switch 54b which, when the reset circuit is closed by actuation of contact 54a, drops the direct current into the pulses needed for the resetting operation.

After the operator of the machine unit has registered the four wattmeter indications ($Lw$, $Ls$, $Rw$, $Rs$) by actuating the proper push buttons 54 to 56 of the registering device 18, the rotor 1 is brought to a stop, turned in its bearings if necessary to bring it into the same angular position of rotation as it was when originally set in bearings 2, 3 and then transferred from the balance checking position 1a to the balance correcting position 1b. This is done by the operation of arms 26, 26a of an exchange mechanism to be later described with reference to Figs. 11 to 14. It is to be noted however that the exchange mechanism transfers the rotor from the position 1a to the position 1b without disturbing its angular position of rotation. This is necessary so that the unbalance correction drilling operations, hereinafter described, will remove material from the rotor at the correct angular positions thereabout in accordance with the coordinate wattmeter readings taken. At the same time, a second rotor 1' is shifted from position 1b to position 1a by the operation of arms 27 and 27a of the same mechanism. Simultaneously, with the exchange of the two rotors 1 and 1', a control pin 28 reverses the position of the switch 19 thus connecting the storer unit through a lead 29 and the collector-type switch 30 with the control device for the unbalance-correcting machine tools such as the two drilling machines 33, 34 shown in the illustrated example. The pin 28 is rigidly connected by a shaft 135 with a crank 35 which imparts a swinging movement to the arms 26 and 27 of the exchange mechanism. Suitable means, such as an electric motor (not illustrated), mechanically connected to the shaft 135 in a known manner to turn the crank 35 180° at a time, is preferably provided to accomplish this operation. This motor may be energized through an electric switch controlled by the operator. After a completed exchange, the rotor 1' is either removed from the machine or, if a sample test is desired, may again be checked for balance before it is taken away. Thereafter, the operator places a new work piece into the balancing machine bearings 2, 3, and another balancing operation commences. The unbalance values then indicated may be passed through the switch 19 and the lead 20 to the then available storer unit, for instance unit 37a.

Each work-piece rotor located in the correcting position 1b is coupled with a positioning motor 38 and with the cummutator switch 30. The positioning motor 38 turns the shaft 39 until the brush leads of switch 30 register with a contact segment electrically energized from the storer device 17. The rotary position of the work piece will then be correct for the first of the coordinate drilling operations. The resulting current pulse energizes, through a suitable relay, the rotor arresting means as well as the drive motor of the drill presses with the result that the drilling tool approaches the work piece, preferably in a rapid stroke. Shortly before reaching the work piece the tool actuates a switch stopping the rapid feed movement and instead placing a slower normal feed in operation. When the tool reaches the work piece a pressure responsive switch 231 or 232 (Fig. 3) issues a pulse which energizes a control device at 31 or 32 (Fig. 1), to be described in detail with reference to Figs. 6 to 10, which issues pulses through lead 40, commutator 30, lead 29, switch 19, and lead 22 to the appertaining storer unit of storer device 17.

The pulses thus transmitted to the storer correspond to the drilling depth needed for the correction of unbalance. When the drilling tool reaches this depth, the storer has reached the zero point. The pulse then issued from the storer controls the drill to commence its return movement and also releases the rotor arresting means and again energizes the positioning motor 38. The rotor is then turned 90°, corresponding to the 90° phase difference between the two analyzing currents supplied to the wattmeter from generator 14. If a separate machining device such as a drill press or the like is provided for each of the two correction planes, the above described machine operation occurs at least twice and at most four times. Each drill must be fed forward at least twice, but both drills may operate simultaneously.

The above described means for transferring measured unbalance components to pulse storing devices and thence to balance correcting tools may be applied in such a manner that an unbalance correction is made for one of two mutually exchangeable work pieces of the same manufacturing series which are both journalled on the same balancing machine. That is, during the running manufacture of a series of mutually similar work pieces, two of them are so placed and exchanged on the machine that at first one of the rotors, in the position 1a, is tested for unbalance by the electric unbalance indicating means and is then placed into position 1b in which any detected unbalance is corrected by machining under control by the registered and stored pulses as described in the foregoing. During the period of unbalance correction, the second rotor of the same series may be checked for unbalance in position 1a of the same balancing machine unit, so that at any time an unbalance analyzing operation and an unbalance correcting operation may be performed simultaneously.

Figure 3:
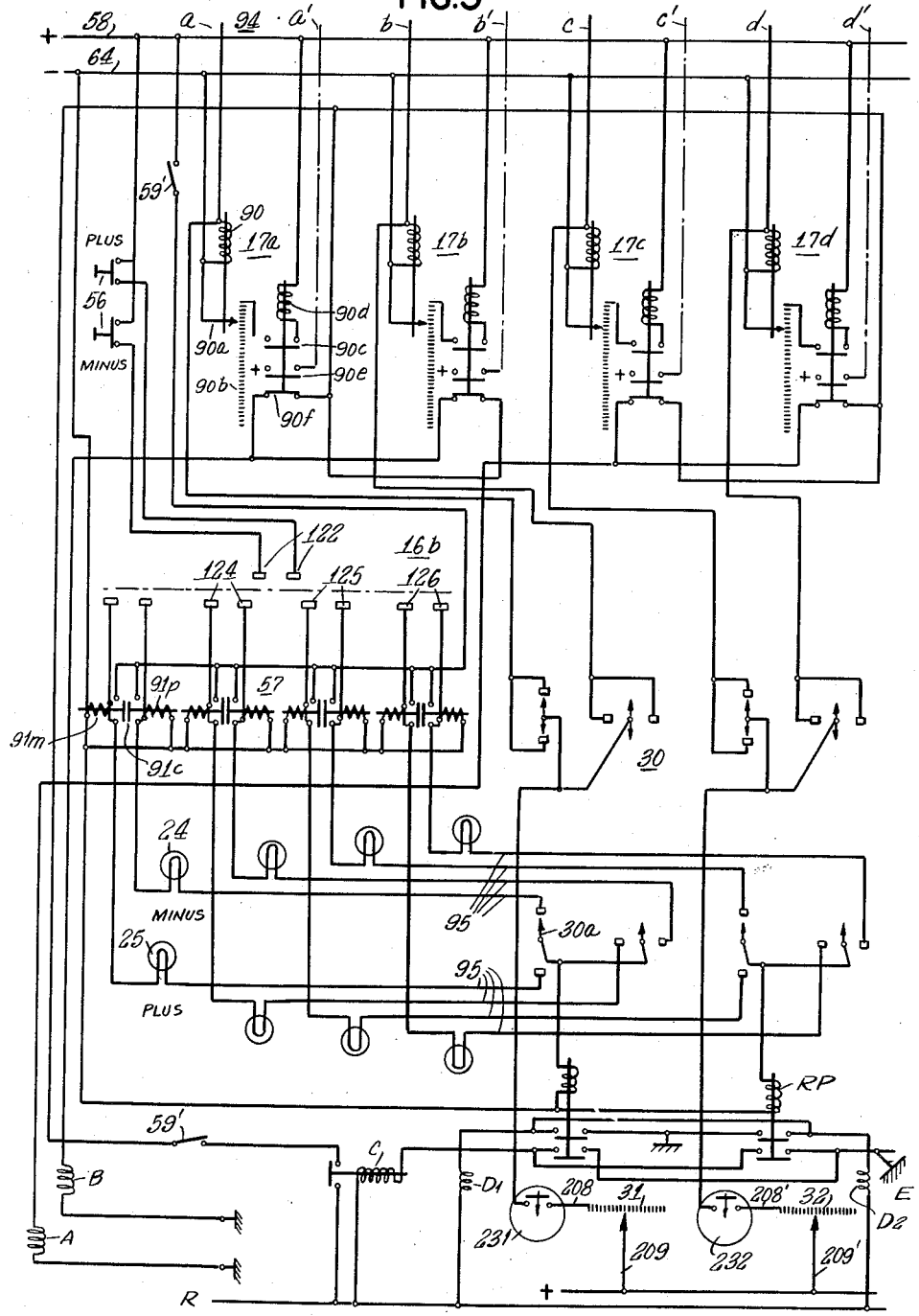

Turning now to the more detailed circuit diagram of Figs. 2 and 3, it will be recognized that only four of the units of storer device 17, namely the storer units 17a, 17b, 17c and 17d, are represented in the diagram (Fig. 3). For further simplification of the circuit diagram, the switch 19 shown in Fig. 1 is omitted. The individul portions of the collector or slip-ring-type switch 30 are shown separately (Fig. 3), it being understood that the individual rotary members, such as the switch member 30a, are mechanically joined with one another and rotate together in 90° steps. To permit a straight-line illustration in the diagram of Figs. 2 and 3, the portion 16 (Fig. 1) of the four-position switch 12 is shown in two parts 16a and 16b, one being illustrated in Fig. 2 and the other in Fig. 3. It will be understood that both parts are so joined that when the contacts 121, shown in Fig. 2, are in connection with leads a and a', the contacts 122 in Fig. 3 are in engagement with the respective contacts 123. Similarly, when the selector switch is set to the next position, contacts 121 in Fig. 2 connect with leads b and b' while contacts 122 in Fig. 3 engage the respective contacts 124. In the third position, contacts 121 (Fig. 2) connect with leads c and c', while contacts 122 (Fig. 3) engage contacts 125; and in the fourth position, contacts 121 (Fig. 2) connect with leads d, d' and contacts 122 (Fig. 3) engage contacts 126.

As is apparent from Figs. 2 and 3, the above-mentioned push-button type registering device 18 comprises a normally energized relay 51, a stepping switch 52, a lifting magnet 53, the above-mentioned unit push buttons 54 (for storing the digit value of the first decade), the tens push buttons 55 (for setting the digit value of the second decade), the direction setting push buttons 56 for plus and minus adjustment (Fig. 3), a holding current relay device 57 (Fig. 3) and the reset push button 54a (Fig. 2) with a pertaining reset circuit. A direct current source has its positive bus 58 connected through a switch 59 with the coil 60 of control relay 51. Switch 59 must be closed to prepare the system for operation and has several other contacts 59' (Figs. 2, 3) which are then also closed. The circuit of coil 60 (Fig. 2) extends through a break contact 62 of each tens push button 55 to the contact slider 63 of the first decade in stepping switch 52. The negative bus 64 of the direct current supply is connected through a break contact 65 of relay 51 and through a lead 66 with the actuating coil 67 of the stepping switch 52, the other end of coil 67 being connected with the positive direct current bus 58 through a switch 59' which must be closed to set the apparatus in operative condition. The negative bus 64 is also connected through a lead 64' and a make contact 69 of each unit push button 54 with the zero-point contact 70 of the first decade in the stepping switch 52. In this manner, the zero position of the system is definitely established. That is, the stepping switch 52, when actuated by the coil 67 of its stepping drive, will incrementally advance until the slider 63 reaches the contact 70. When that position is reached, coil 60 of relay 51 becomes energized in the circuit 58—59—60—all contacts 62—63—70— all contacts 69—64'—64. Relay 51 then opens its break contact 65 and deenergizes the drive coil 67 of the stepping switch 52 thus stopping the stepping switch in the zero position then reached. Hence, at the start of each course of operations, the stepping switch 52 is set to zero.

Figure 4:
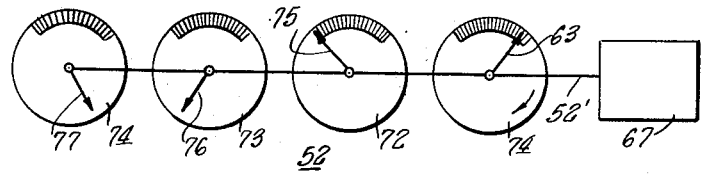

The stepping switch 52, corresponding to the push button arrangement of the illustrated embodiment, comprises four sequentially operative units 71, 72, 73 and 74 each with a bank of ten contacts. The four banks, or the four pertaining slide contacts are staggered so that only one of the slide contacts 63, 75, 76 or 77 at a time is in contact engagement with the pertaining contact bank. One possibility of such a staggered displacement is schematically shown in Fig. 4. It will be seen that, when the slide contacts on shaft 52' of the stepping switch 52 progress clockwise, the slide contact 63 must pass beyond the last contact of the bank in selector switch unit 71 before slide contact 75 of unit 72 enters into engagement with the first bank contact of unit 72, and so forth.

A pulse contact 89 of the stepping switch 52 closes its circuit once for each individual step movement of the switch and thus issues during each operation a number of pulses equal to the total number of steps. The circuit of pulse contact 89 extends through the contact of a pulse control relay 88 so that the pulses are transmitted to the pulse storage means, still to be described in more detail, only when relay 88 is energized.

The normally open contact elements 78 of each unit push button 54 connect, when closed, the minus pole (bus 64 and lead 64') to a particular one of the bank contacts in each of the four contact banks 71 to 74 of the stepping switch 52. The circuit connections extend through a manifold connector 80 of whose conductors only one is separately shown and designated by 79. Conductor 79 connects the contact element 78 of only one push button 54, namely the one indexed (5), with the No. 5 bank contact in bank 71, also with the No. 5 contact in bank 72, and with the corresponding one contact in banks 73 and 74. Similarly, each of the other conductors of the manifold connector 80 connects one of the respective contact elements 78 with one correlated contact in each of banks 71 to 74. The remaining one contact in each of banks 71 to 74, this remaining contact corresponding to the zero value of the bank, is connected through a normally open contact element of one of the respective tens push button switches 55 with a circuit point between the zero-indexed push button 55 and the normally closed contact element 69 of the next adjacent push button 55.

Assume that the unit push button 54 indexed (5) is depressed by the operator. Then the break contact element 69 of that push button disconnects the minus pole (negative bus 64 and lead 64') from the zero contact 70 of bank 71. Instead, the make contact element 78 of the same push button now connects the minus pole through conductor 79 of the manifold connector 80 to the one correlated No. 5 contact of all four decades of bank contacts. The coil 60 of relay 51, previously energized in the circuit 58—59—60—all contacts 62—63— 70—all contacts 69—64'—64, becomes deenergized due to the opening of the contact element 69 of the depressed push button. Hence relay 51 drops out and, by closing its contact 65, passes current through drive coil 67 of the stepping switch 52. The stepping switch displaces its slide contacts until the slide contact 63 again coincides with the displaced minus pole, i. e. until the slide contact 63 reaches the bank contact No. 5 in bank 71. At that moment, the coil 60 in relay 51 receives a current pulse through the now completed circuit 58— 59—60—all contacts 62—63—bank contact No. 5 of the bank 71—79—78—64'—64. Relay 51 picks up and opens at contact 65 the circuit of stepping switch coil 67.

The adjustment of the stepping switch to any other unit value is analogous to the performance just described.

The actuation of any one push button 54 or 55 causes the pulse control relay 88 to be energized which controls the further transmission of the current pulses as will be explained.

To register, for instance, a two-digit value of the wattmeter indication, one push button in each of the respective unit and tens rows is to be depressed. Assume, for instance, that the tens push button 55 representing the value (30) is thus depressed, then the positive bus 58 of the direct current supply is connected through the make contact 81 and through lead 82 with the slide contact 77, thus slecting the decade bank 74 of the stepping switch 52. Assuming that the likewise depressed unit push button represents the value (1), the negative bus 64 is now disconnected from the zero-point contact 70 of contact bank 71 due to the opening of break contact 69, and this zero point is shifted by the closing of make contact 78 to the corresponding contact in the bank of the decade 74. Consequently, the stepping switch 52 will now operate to shift the slide contact 77 relative to its contact bank until the slide contact has found the zeroed bank contact. The number of individual switching steps corresponds to the numerical value represented by the actuated push buttons. Hence, the desired number of pulses is issued.

Figure 5:
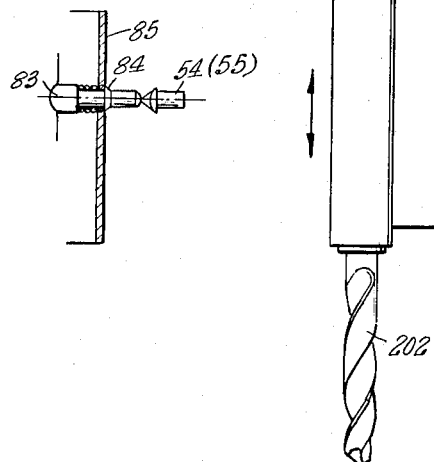
Figure 6:
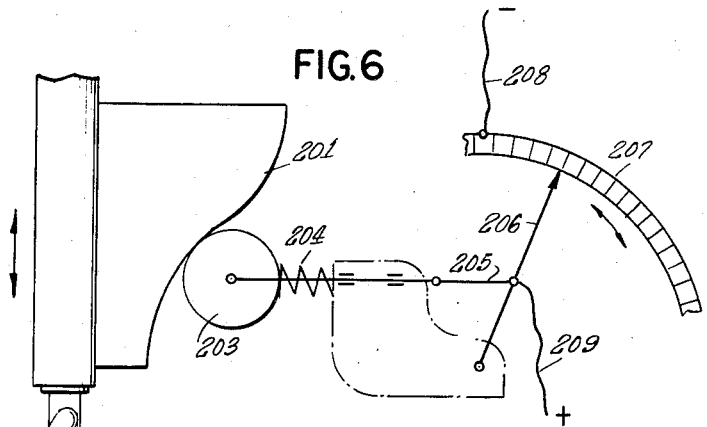

Each of push button contacts 54 and 55 is equipped with a pressure member 83 (Fig. 5) which is coaxially arranged relative to the push button and has a conical shoulder 84 engageable with a movable slider 85 (Figs. 2, 5). Slider 85 retains the pressure member 83 together with the pertaining push button in the depressed position until the desired number of pulses is totalized by the stepping switch. Then the make contact 86 of relay 51 (Fig. 2) applies a pulse to the lifting magnet 53 which raises the slider 85 against the force of a spring 87 so that the pressure member 83 and the pertaining push button can spring back to the normal position. During this return movement of the push button, the pulse control relay 88 immediately interrupts the transmission of pulses. Simultaneously, the minus pole is again connected with the zero contact 70 of bank 71. This causes the stepping switch 52 to operate until the slide contact 63 again reaches the zero point. Thereafter, the stepping switch is again available for a new adjustment. It will be understood that, while in Fig. 2 the slider 85 is 55, it is, of course, joined with each of these switches in shown separate from the push button switches 54 and the manner shown in Fig. 5.

The pulses produced by the pulse contact 89 of the stepping switch 52 (Fig. 2) are passed through the four position switch 12 to individual storer units, for instance units 17a to 17d for the left-vertical, left-horizontal, right-vertical and right-horizontal unbalance components respectively. Each individual storer unit may consist of conventional single-stage rotary stepping switch, (Fig. 3). These switches are schematically shown in straight-line development, it being understood that when, for instance, the movable member 90a of storer unit 17a is stepwise driven by the pertaining stepping drive coil 90, this member will progressively pass through all steps in a fixed direction and thereafter will again reach the zero position. The unidirectional operation of the storer units makes it necessary to correlate the pulses received through lead 94 from the push button device 18 with the number of steps performed by the rotary switch during one full rotation. Then, the pulses to be taken from the storer for the control of the balance-correcting machine tool (33, 34 in Figs. 1, 8, 11) correspond to the number of steps remaining for the rotary switch to return to the zero point. For instance, if the number of steps for a full rotation is forty, and if the storer is supposed to supply fifteen pulses to the machine tool, then the storer must receive twenty five pulses in order to retain fifteen pulses which are given onto the control device of the machine tool during the subsequent stage of operation.

The relay device 57 has two relay units such as those denoted by 91p and 91m for each individual storer unit. These relay units control the plus and minus lamps 24 and 25 as well as two auxiliary control relays LP and RP for the left and right drill presses respectively. The plus button 56, when depressed, connects the plus pole (bus 58) through one of contacts 122 and, for instance, through one of contacts 123 in switch part 16b to relay unit 91p whose other end is connected to the minus pole (bus 64). Relay 91p then closes its contact 91c which prepares a circuit for the plus lamp 24 pertaining to the storer unit 17a. The lamp circuit extends through the contact 30a of the commutating switch 30 and also through the coil of control relay LP. Consequently, relay LP picks up and closes its contacts.

When the minus button 56 is depressed, the relay unit 91m is similarly effective to light the minus lamp 25 of storer unit 17a when the commutator contact 30a is in the proper position, then also causing the relay LP to pickup.

The other storer units, through their associated relay units in relay device 57 cause lighting of the pertaining plus or minus lamp. The relay unit for storer 17b then also energizes the relay LP, while the relay units for storers 17c and 17d energize the relay RP. Consequently, one of the two relays LP and RP is energized at a time depending upon whether the stored pulses to be passed onto the machine-tool control devices correspond to unbalance components in the right or left correction plane.

Whenever one of relays LP and RP is picked up, it energizes a relay C (Fig. 3) whose contact then connects a current lead R through switch 59' to the break contacts 90f of the storer units 17a to 17d. Each contact 90f is closed as long as any value is stored in the pertaining storer unit. Each contact 90f then completes an energizing circuit for the release coil A or B of respective controllers that energize the two respective feed motors of the balance correcting drill presses as will be more fully described with reference to Figs. 8 to 10. According to Fig. 3, coil A is controlled by storer units 17c and 17d, while coil B is controlled by storers 17a and 17b.

Also shown in Fig. 3 are the coils D1 and D2 of two actuating magnets for the holding devices of the drill presses, serving to secure the work piece in position during the balance correcting machining operation. The magnet coils D1 and D2 are energized when either of relays LP and RP is picked up.

Figs. 11 to 14 show details of the exchange mechanism for the two rotors 1 and 2 to be simultaneously accommodated in the machine unit. The rotor 1 to be balanced is journalled in the oscillatorily supported bearings 2, 3 of the balancing machine. The arms 26 and 26a (Figs. 11, 12) embrace the rotor at their free ends with some lost motion so as not to interfere with the oscillations of the bearings. The rotor 1', already tested for balance, lies in the rigidly mounted bearings 41 of the machining section of the unit and is also engageable by the free ends of the arms 27 and 27a likewise with some lost motion (Fig. 11). The swinging arms 26, 27 and 26a, 27a are revolvably journalled on pivot pins 136, 137 or 136a, 137a which are eccentrically mounted on the crank member 35 or 35a of crankshaft 135. Links 109, 109a, 110 and 110a connect the arms with pressure cylinders 111 or 111a (Fig. 12). For exchanging the two rotors 1 and 1' a control pulse is applied to the pressure cylinders. The cylinders then lift the junction points of the links from the position 112 (Fig. 11) to the position 113 (Fig. 12). This causes the swinging arms to move and to lift the two rotors out of their bearings (Fig. 12). A rotation of crank 35 by 180° as hereinabove described then causes the arms to swing into the position shown in Fig. 13 while the rotors move along a curved path 14. At the end of this swinging movement, the two rotors have exchanged positions. A counter pulse applied to the pressure cylinders 111 and 111a then permits the links 109, 110 and 109a, 110a to return toward the previous position to such an extent that the two rotors are deposited in the respective bearings 2, 3 and 41 and again become separated from the free ends of the arms (Fig. 14).

Figure 7:
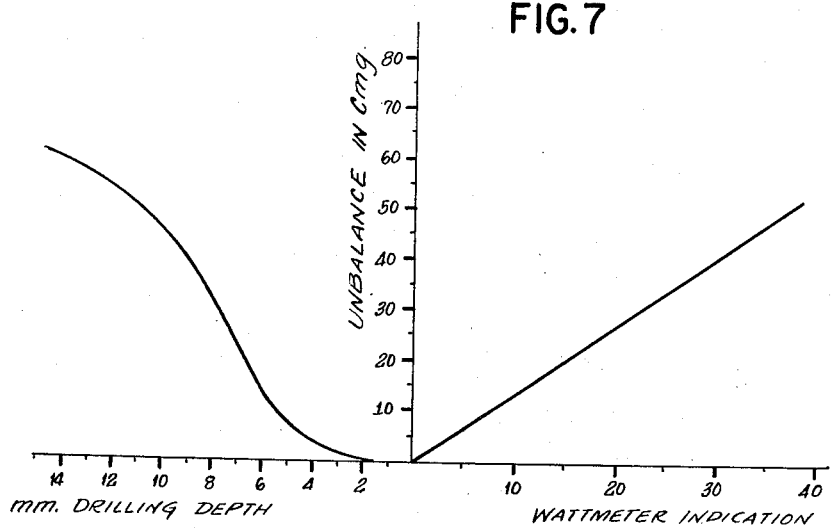
Fig. 7 is an explanatory coordinate diagram relating to the device of Fig. 6.

An example of a suitable design of the above-mentioned control devices 31, 32 for unbalance correction by machining of the work piece is shown in Fig. 7. The illustrated device 31 has a curved cam 201 mounted on the forwardly and reversely movable tool such as the drill 33 in the illustrated example. A cam roller 203 is forced against the cam contour by a spring 204 and rolls along the contour during the machining operation. A rod 205 transmits the shifting movement of cam roller 203 to a slider 206 which engages a bank of contacts 207. Current is supplied to the slider and bank contacts by leads 208 and 209 according to the circuit diagram of Fig. 3. The individual contacts of bank 207 (Fig. 7) receive current as soon as the drill, during its forward feed, impinges upon the rotor to be machined, at which moment the pressure switch 231 (Fig. 3) causes the drilling operating to commence. During the feed movement of the drill, cam 201 (Fig. 7) and roller 203 with rod 205 cause the slider 206 to move from contact to contact of bank 207. Thus the slider 206 transmits pulses to the storer unit then switched in. This performance has already been mentioned with reference to the storer unit 17a. The subdivision of the contact path along bank 207 corresponds to the characteristic apparent from the coordinate diagram of Fig. 7.

This diagram shows the drilling depth in millimeters (mm.) in dependence upon the amount of unbalance in centimeter grams (cmg.) eliminated by the drilling operation. The impulse transmission from the control device of Fig. 6 to the storer unit is in linear proportion to the eliminated amount of unbalance, for instance so that each pulse is equivalent to one cmg.

Figure 8:
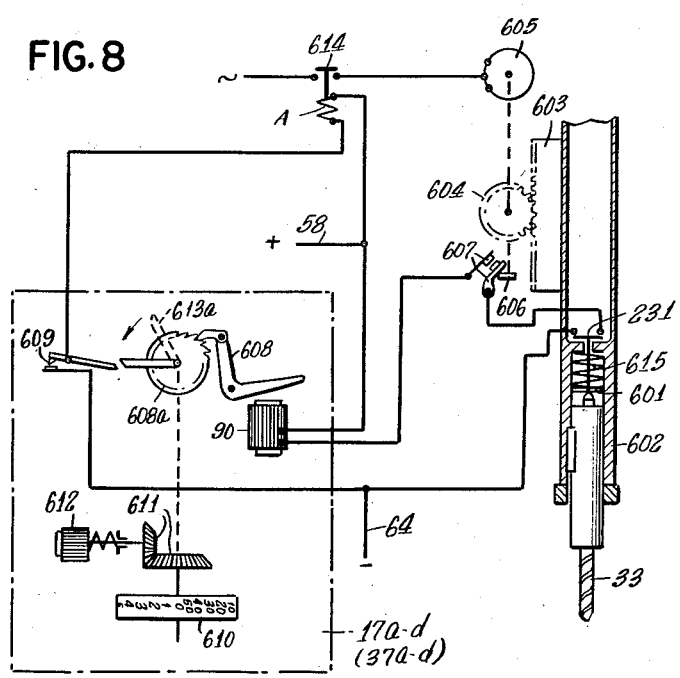
Figs. 8 and 9 show respective embodiments of the tool-feed controls for a machine otherwise similar to Figs. 1 to 3, these two controls having respective feed-responsive contact devices different from that of Fig. 6 but of an equivalent operation substantially as represented by Fig. 7.

A modified tool-feed responsive contact device, also involving an operation according to Fig. 7, is shown in Fig. 8 in conjunction with a more detailed illustration of the relay circuits in the storer unit controlled by the pulses issuing from the feed-responsive contact device.

The chuck member for a drill 33 is slidably mounted within its tail spindle 602. On the remote end of the chuck member a pressure controlled contact 231 (see also Fig. 2) is arranged. A spring 615 of adjustable strength controls the contact device. The spring may be so adjusted that the drill tip must penetrate into the work piece a definite small drilling depth before the spring controlled contact is operated by the drill. The advantage of such an arrangement is that the initial removal of material by the conical drill tip does not consume any of the control so that the pulses are all used to determine the drill work and the material to be eliminated within the cylindrical bore hole.

When the drilling pressure exceeds the reaction of the spring 615 drill 33 actuates contact 231 by moving the cushion plate 601 upwardly. The feed movement of the drill is imparted to the tail spindle 602 by motor 605 through a rack 603 and a pinion 604. Pinion 604 actuates an interrupter cam 606 or a similar device which actuates a switch 607 during the pinion revolution. Switch 607 then issues pulses exactly controlled as to number and frequency. These pulses pass through the coil 90 (see also Fig. 3) of the stepping mechanism 608 in a stepping relay within a storer unit of the storers 17 or 37 (Fig. 1).

For securing a definite control of the number of steps to be executed by the stepping mechanism of the storer, a control device is provided. It comprises the zero-point contact 609 and a pawl 613 on the stepping drive. The pawl can be manually adjusted by a knurled wheel 612 and a bevel gear 611 with scale 610. The amount to be adjusted is indicated on scale 610.

Contact 609 controls the release coil A (or B, see Fig. 3) of a motor controller whose contact device 614 is connected in the energizing circuit of the feed motor 605.

The proper coil A or B is energized when the zero point is reached in the storer. Then the controller drops out thus terminating the feed movement of drill 33.

The feed control device of Fig. 8, as a whole, operates as follows:

Assume that the adjusting device 612 has been set to place the pawl 613 of the stepping drive into the position 613a, and that with this setting the stepping drive of the storer unit will perform 15 steps, this number of steps being indicated on scale 610. A circuit is now closed from positive lead 58 through coil A (or B, Fig. 3) and zero contact 609 to the negative lead 64. Contact device 614 energizes the feed motor 605. The drill moves against the work piece, closes at arrival on the work piece the pressure-controlled contact 231, as described in the foregoing. Thus, a circuit is closed from lead 58 through coil 90, interrupter contact 607 to lead 64. Thereupon, fifteen pulses are issued at a speed dependent upon the feeding speed and the gear ratio of cam 606. After the fifteenth pulse, pawl 613 opens the contact 609 and the controller stops the feed movement of the drill press.

Figure 10:
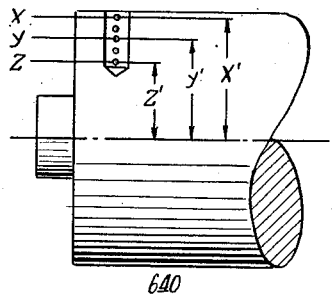
Figure 9:
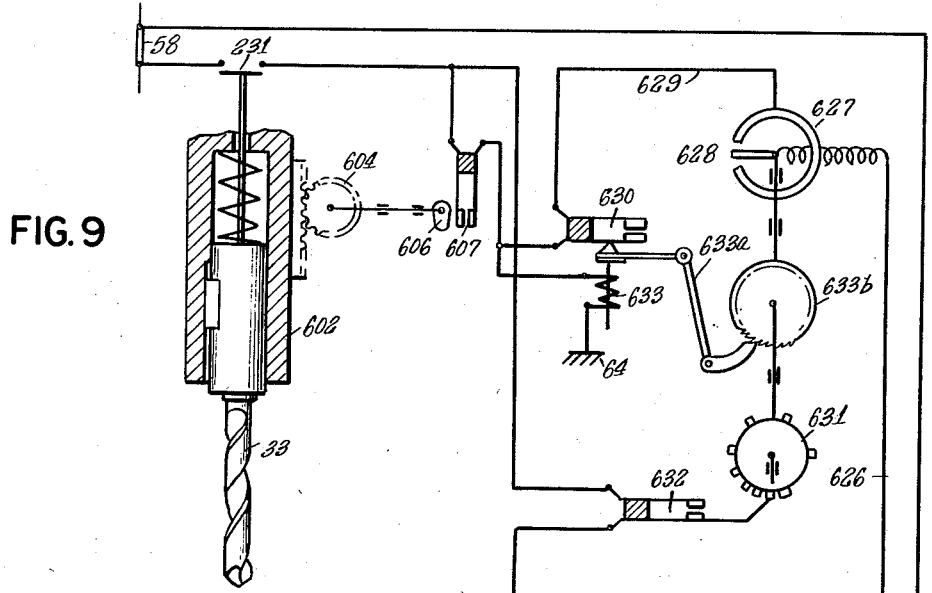

With reference to Figs. 9, 10 and the characteristic illustrated in Fig. 7, another embodiment will now be described, comprising a compensating system which secures proportionality between the readings of a wattmeter or the like instrument of linear characteristic and the nonlinear characteristic of the changes in unbalance arising from the unbalance correcting operation.

A work piece 640 already checked for unbalance is to be drilled radially in order to correct unbalance by machining. The portions eliminated from hole 641 by drilling are marked $x$—$y$—$z$ (Fig. 10). It is obvious that the drilling process eleminates from the work piece substantially invariable portions of material per time unit. However, the unbalance, caused by the material being eliminated changes in proportion to its radial position (radius of correction). A spring contact 231 is mounted in the tail spindle of the drill, and an interrupter with a cam 606 issues pulses during the drilling operation as described in conjunction with Fig. 8. According to Fig. 9, however, the pulses are transmitted to the coil 633 of a compensating relay of the step-switch type. The driven shaft of the relay carries a cam device 631 whose cam division corresponds to the characteristic shown by the curve in the left portion of Fig. 6. A switch 632 connects the positive lead 58 through a lead connected with the coil 90 of a storer drive thus transmitting pulses to the storer drive. The storer drive is pre-adjusted as described above in connection with Fig. 8 and is controlled in dependence upon the drill feed until the zero contact 609 of the storer opens and stops the feed movement.

When the zero point is reached within the storer, contact 625 is closed. Through lead 58, switch 625, lead 626, reset device 627, 628, lead 629 and interrupter 630 the coil 633 is energized. Thereupon the compensation relay picks up and switch 630 is opened. Simultaneously cam 631 moves one step ahead. The compensating relay is actuated until a sliding contact 628 leaves a pertaining contact 627 and the cam device 631 has reached its zero position.

It has been found, with machinery designed and operated in accordance with the above described embodiment of the invention, that the time needed for a complete unbalance detecting and correcting performance can be reduced to as much as about ⅙ of the time needed with conventional methods and machinery.

Those skilled in the art, upon a study of this disclosure, will recognize that the invention, especially as regards the components of the above described machinery and apparatus, permit of various modifications and may be embodied in devices of a design and arrangement other than specifically illustrated and described.

I claim:

1. Apparatus for balancing rotors, comprising two sets of bearing means for accommodating a rotor in two respective positions, drive means connectable with the rotor in one of said positions for revolving the rotor in one of said sets of bearing means, unbalance analyzing means correlated to said one set of bearing means for analyzing the magnitudes of unbalance components of the revolving rotor at a pair of points on the periphery thereof separated by a predetermined angle of rotation, an exchange mechanism for transferring the rotor between said positions, said exchange mechanism being operative to maintain the rotary position of said rotor as received from said first position, positioning means engageable with the rotors in said other position for selectively rotating it by amount equal to said predetermined angle of rotation from said first rotary position to a new rotary position, unbalance correcting machining means engageable with the rotor in said selected rotary positions, an electric pulse transmitter adjustable in accordance with said magnitudes and having translating means for providing trains of pulses corresponding to said respective magnitudes, said pulse transmitter having a plurality of pulse storer units for storing said respective trains of pulses, a rotary commutator-type selector switch mechanically joined with said positioning means and selectively adjustable to said respective rotary positions, said rotary selector switch connecting said machining means with one of said respective storer units depending upon the rotational position of the rotor for controlling said machining means in dependence upon the train of pulses stored by said one storing unit.

2. Apparatus for balancing rotors, comprising two sets of bearing means for sequentially accommodating in two respective positions the rotor to be balanced, drive means disposed at one of said sets of bearing means for revolving the rotor in one of said positions, unbalance analyzing means also disposed at said one set of bearing means for analyzing the unbalance magnitudes of the revolving rotor at a pair of points on said rotor separated by a predetermined angle of rotation, an exchange mechanism for transferring the rotor between said positions, said exchange mechanism being operative to maintain the rotary position of said rotor as received from said first position, unbalance-correcting machining means engageable with the rotor in said other position, pulse storing means adjustable in accordance with the respective magnitudes of said unbalance components, tool-feed responsive electric control means joined with said machining means and electrically connected with said storing means for causing said storing means to control said machining means in dependence upon the tool-feed movement of said machining means, and drive means controlled by said pulse storing means for revolving said rotor in said other position by an amount equal to said predetermined angle of rotation.

3. Apparatus for balancing rotors, comprising two sets of bearing means for sequentially accommodating in two respective positions the rotor to be balanced, drive means disposed at one of said sets of bearing means for revolving the rotor in one of said positions, unbalance analyzing means also disposed at said one set of bearing means for analyzing the unbalance magnitudes of the revolving rotor at a pair of points on said rotor separated by a predetermined angle of rotation, an exchange mechanism for transferring the rotor between said positions, said exchange mechanism being operative to maintain the rotary position of said rotor as received from said first position, unbalance-correcting machining means engageable with the rotor in said other position, pulse storing means having a zero position and being adjustable from said position in accordance with an analyzed magnitude, said storing means having a pulse-responsive stepping drive, a control circuit connecting said storing means with said machining means for controlling the latter to operate when said stepping drive is out of said zero position, tool-feed means joined with said machining means and having a tool-feed responsive pulse contact device connected with said stepping drive for resetting said pulse storing means to said zero position, and drive means controlled by said pulse storing means for revolving said rotor in said other position by an amount equal to said predetermined angle of rotation whereby said tool feed means and the amount and rotary position of work-piece material removed by said machining means are controlled.

4. A rotor balancing machine, comprising two sets of bearing means for accommodating a rotor in two respective positions, said sets having respective bearing axes parallel to each other, an exchange mechanism having two members simultaneously engageable with respective rotors in said two positions and movable in mutually inverse transferring relation for passing a rotor from either one of said positions to the other, unbalance analyzing means connected with the bearing means of one of said sets for determining unbalance data of the rotor in said one position, unbalance-correcting machining means engageable with the rotor in said other position, a data storing device connected with said analyzing means, and electric control means connecting said storing device with said machining means for controlling the latter in dependence upon the stored data, whereby the rotor after being unbalance analyzed in said one position is transferred to said other position for machining and thereafter is transferred back to said one position to permit balance checking.

5. A rotor balancing machine, comprising a machine base structure defining an operator's location, two sets of coaxially aligned bearing means mounted on said structure for accommodating a rotor in two respective positions, said two sets having respective bearing axes parallel to each other and located one behind the other relative to said location, an exchange mechanism having two transfer members engageable with respective rotors in said two positions, said two members being interlinked and movable in mutually opposed sense of transferring operation so that either of said members transfers from one to the other position while the other member transfers from the other to said one position, drive means connectable with the rotor in one of said positions for revolving the rotor in one of said sets of bearing means, unbalance analyzing means having vibration pick-ups mounted on said structure and connected with said respective bearing means of said one set for determining unbalance data of the rotor, a data storing device connected with said analyzing means for storing said data, unbalance-correcting machining means mounted on said structure and engageable with the rotor in said other position, and electric control means connecting said data storing device with said machining means for controlling said machining means in dependence upon said stored data, whereby the rotor after being unbalance analyzed in said one position is transferred to said other position for machining and thereafter is transferred back to said first position to permit balance checking.

6. A rotor balancing machine, comprising two sets of bearing means for accommodating two rotors in two respective positions, said sets having respective bearing axes parallel to each other, a parallel-motion exchange mechanism simultaneously engageable with said two rotors in said respective positions for transferring each rotor between said positions, drive means connectable with the rotor in one of said positions for revolving the rotor in one of said sets of bearing means, unbalance analyzing means connected with the bearing means of said one set for analyzing unbalance data of the rotor revolving in said one position, unbalance correcting machining means engageable with the rotor in said other position, a data storing device for storing said unbalance data, and control means connecting said storing device with said machining means for controlling the latter in dependence upon said stored data.

7. A rotor balancing machine, comprising two sets of bearing means for accommodating a rotor in two respective positions, said sets having respective bearing axes parallel to each other, a parallel-motion transfer mechanism engageable with the rotor for passing it from one to the other position, unbalance analyzing means connected with the bearing means of one of said sets for determining unbalance data of the rotor in said one position, unbalance-correcting machining means for machining the rotor in said other position, a data storing device connected with said analyzing means, releasable control means connecting said storing device with said machining means for controlling the latter in dependence upon the stored data, said machining means having tool feed means movable toward the rotor, and releasing means responsive to movement of said feed means and connected with said control means for releasing said control means to control said machining means only after the tool feed means has moved the tool to a given positional relation to the rotor.

8. In a rotor balancing machine according to claim 6, said data storing device comprising pulse-responsive stepping-switch units each having a member displaceable from a zero position a distance corresponding to one of said respective unbalance data to be stored; said control means comprising a tool-feed responsive pulse transmitter joined with said machining means to be controlled thereby and selector switch means electrically connecting said pulse transmitter with one of said respective switch units for re-setting each unit to said zero position in dependence upon the tool-feed motion of said machining means; said machining means comprising a tool-feed drive; and said control means being connected with said tool-feed drive for operating said drive as long as said selected unit member is displaced from said zero position.

References Cited in the file of this patent

UNITED STATES PATENTS

| | | |
|---|---|---|
| 2,004,540 | Smith et al. | June 11, 1935 |
| 2,243,379 | Johnson | May 27, 1941 |
| 2,449,429 | Van Degrift et al. | Sept. 14, 1948 |
| 2,492,092 | Bulliet | Dec. 20, 1949 |
| 2,554,033 | Kohlhagen | May 22, 1951 |
| 2,570,660 | Gamble | Oct. 9, 1951 |
| 2,585,325 | Imshaug | Feb. 12, 1952 |

FOREIGN PATENTS

| | | |
|---|---|---|
| 642,916 | Great Britain | Sept. 13, 1950 |